(12) United States Patent
Malamut et al.

(10) Patent No.: US 12,235,738 B2
(45) Date of Patent: Feb. 25, 2025

(54) INTELLIGENT DESTINATION TARGET SELECTION FOR REMOTE BACKUPS WITH AWARENESS OF TEMPORARY BACKUP TARGET FOR DATA RESTORES

(71) Applicant: Dell Products L.P., Round Rock, TX (US)

(72) Inventors: Mark Malamut, Aliso Viejo, CA (US); Jennifer M. Minarik, Zionsville, IN (US); Brian E. Freeman, Golden, CO (US)

(73) Assignee: Dell Products L.P., Round Rock, TX (US)

( * ) Notice: Subject to any disclaimer, the term of this patent is extended or adjusted under 35 U.S.C. 154(b) by 28 days.

(21) Appl. No.: 18/174,488

(22) Filed: Feb. 24, 2023

(65) Prior Publication Data

US 2024/0020207 A1     Jan. 18, 2024

Related U.S. Application Data

(63) Continuation-in-part of application No. 17/863,048, filed on Jul. 12, 2022, now Pat. No. 11,880,281.

(51) Int. Cl.
*G06F 11/14* (2006.01)
(52) U.S. Cl.
CPC ...... *G06F 11/1469* (2013.01); *G06F 11/1451* (2013.01); *G06F 11/1453* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 11,593,223 B1 * | 2/2023 | Mehta | G06F 11/1461 |
| 2012/0311376 A1 * | 12/2012 | Taranov | G06F 11/2097 |
| | | | 714/4.11 |

* cited by examiner

*Primary Examiner* — Brian R Peugh
(74) *Attorney, Agent, or Firm* — Staniford Tomita LLP

(57) ABSTRACT

Embodiments are described for a system that automatically determines the ideal backup target to send backup data. Temporary backup targets are automatically created to handle backups for mobile data assets. A backup agent sends incremental backups to any temporary backup target (TBT), which are later consolidated with primary backup target (PBT) data. To facilitate data backup to a TBT and restore operations from data located on a PBT or TBT, a Backup Location Catalog (BLC) is created for each asset to reside on the asset. A Change Record Catalog (CRC) is created for each TBT backup per asset and each CRC resides on the asset until the associated data is consolidated back to the PBT. Assets thus have access to all backups, including the data on the TBT(s) before that data is consolidated back to the PBT.

20 Claims, 9 Drawing Sheets

INTELLIGENT DESTINATION TARGET SELECTION FOR REMOTE BACKUPS WITH AWARENESS OF TEMPORARY BACKUP TARGET FOR DATA RESTORES

CROSS-REFERENCE TO RELATED APPLICATIONS

This application is a Continuation-In-Part application and claims priority to U.S. patent application Ser. No. 17/863,048 filed on Jul. 12, 2022 and now U.S. Pat. No. 11,880,281, entitled "Intelligent Destination Target Selection for Remote Backups," which is assigned to the assignee of the present application, and which is hereby incorporated by reference in its entirety.

TECHNICAL FIELD

This invention relates generally to data backup systems, and more specifically to intelligently selecting destination targets for remote backups.

BACKGROUND

Backup software is used by large organizations to store their data for recovery after system failures, routine maintenance, archiving, and so on. Backup sets are typically taken on a regular basis, such as hourly, daily, weekly, and so on, and can comprise vast amounts of information. In today's world, many of a company's digital assets may be constantly moving and not always located in the same geographic location. Some examples include an employee who is constantly traveling with their company laptop, a cloud deployed virtual machine (VM) where the location is determined at deploy time, or an application or asset that resides in a vehicle that is constantly changing locations.

Creating backups of these types of assets can be challenging because of this mobility and the various network connections the device hosting these assets might have available. In many situations the network connection between the asset and a traditional backup system can be very poor due to connectivity issues. In this case, completing a backup might be very time consuming, or even take more time than available to complete. This issue can quickly become critical if the backup system is unable to successfully complete a backup over long periods of time, which can put the company at a high risk for data loss.

A primary flaw in traditional backup systems is that they typically have a fixed backup target to which to send the backup data. In addition, changing the backup target typically incurs the high cost of creating a new full backup, as opposed to a more customary incremental backup. Another limitation is that most backup systems have one primary backup target defined for multiple assets, and do not provide the flexibility to dynamically pick a backup target based on a "best available" algorithm that may result in different targets based on the location of the asset.

Present systems typically require a user to manually deploy backup storage targets and then configure backup policies to then use these fixed targets. In addition they need to manually assign the assets to policies with designated storage. Every time an asset changes its geographic location, the protection policy for that asset needs to be manually updated to reconfigure it to use a different fixed backup target. Changing the backup target incurs the cost of a new full backup, which can have a huge performance and time implication for large assets. Additionally, if the backup target and its infrastructure is not owned by the asset owner, the company or other responsible party for the asset will incur additional costs for using the backup infrastructure.

What is needed, therefore, is a backup system in which a data asset may send its backup data to a dynamically selected backup target for remote backups and assets in motion.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
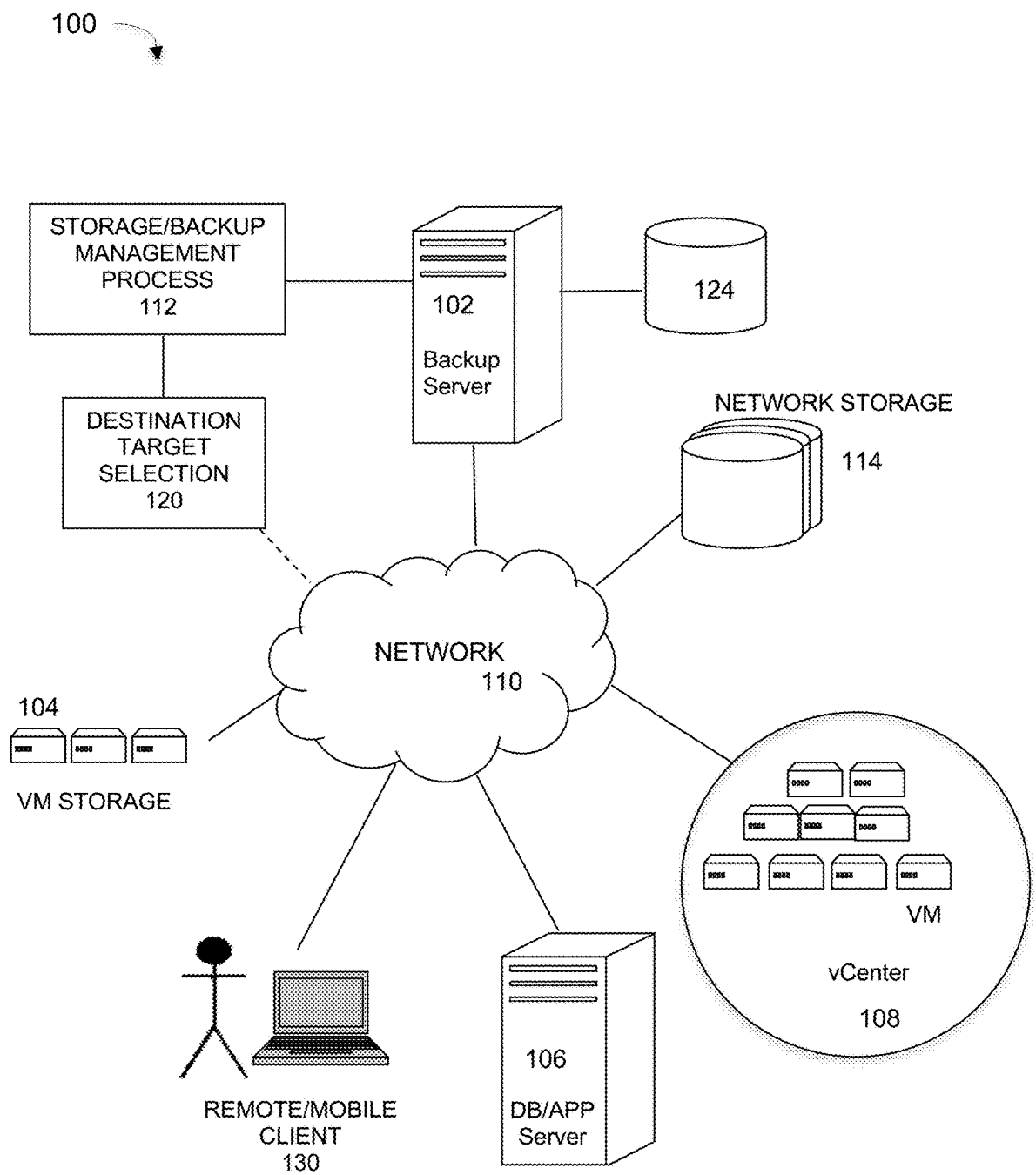
FIG. 1 is a diagram of a network implementing an intelligent destination target selection process, under some embodiments.

A detailed description of one or more embodiments is provided below along with accompanying figures that illustrate the principles of the described embodiments. While aspects are described in conjunction with such embodiment(s), it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the certain methods and processes described herein. Applications may also be downloaded, in whole or in part, through the use of a software development kit or toolkit that enables the creation and implementation of the described embodiments. In this specification, these implementations, or any other form that embodiments may take, may be referred to as techniques. In general, the order of the steps of disclosed processes may be altered within the scope of the embodiments.

Some embodiments involve data processing in a distributed system, such as a cloud based network system or very large-scale wide area network (WAN), and metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a backup system in which a data asset sends its backup data to a dynamically selected backup target for remote backups and assets in motion. The selection is based on a series of attributes such as network throughput and availability. Backups which are sent to a temporary backup target are later consolidated at the assets primary backup target. The data assets may be mobile or they may reside at a single location to address network or other availability issues with any source connecting to a backup target FIG. 1 illustrates a computer network system that implements one or more embodiments of a network data backup system implementing an intelligent backup target selection process, under some embodiments. In system 100, a backup server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs may be provided to serve as backup targets. For example, virtualized data center (vCenter) 108 that includes any number of VMs for target storage. The VMs or other network storage devices serve as target storage devices for data backed up from one or more data sources, such as a database or application server 106, or the data center 108 itself, or any other data source, in the network environment.

In an embodiment, system 100 may comprise at least part of a Data Domain Restorer (DDR)-based deduplication storage system, and storage server 102 may be implemented as a DDR Deduplication Storage server provided by EMC Corporation. However, other similar backup and storage systems are also possible.

The client and server computers are coupled directly or indirectly to each other and the system resources (target storage, routers, etc.) through network 110, which is typically a public cloud network (but may also be a private cloud, LAN, WAN or other similar network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

Network elements that generate the data to be backed up are referred as backup 'clients' and backup agents deployed throughout the system perform the data backup through process 112 and backup server 102. The data to be backed up by process 112 can be referred to as data assets and may be any appropriate data, such as database data that is part of a database management system or any appropriate application supported by server 106.

The backup clients may be static clients that are fixed in position or location and always use a fixed network address, such as a static server (e.g., 106), or they may be mobile clients or data sources that are dynamically deployed on demand or according to certain policies or schedules, such as virtual machines or data centers 108. One typical example of a mobile client is a user operating a mobile computer 130 who logs in to the backup server from different locations as they move around. The term 'asset' as used herein may thus generally refer to a device that generates or processes data to be backed up, such as a server, computer, portable computer (laptop/notebook/tablet), communication device (mobile phone), or any other processing device capable of being moved and used to generate data. This term can also refer to the actual data (backup dataset) generated by the device.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. Certain defined backup policies usually dictate which target storage devices are used for the different backup clients, and different storage targets may be used for different clients depending on client location and size/type of the backup datasets. Current backup systems typically require a user to manually deploy backup storage targets and then configure backup policies to then use these fixed targets and manually assign the assets to policies with designated target storage devices. As stated previously, every time an asset changes its location, the policy for that asset must be reconfigured to point to the primary backup target. As shown in FIG. 1, system 100 includes an intelligent destination target selection process 120 that dynamically selects the appropriate backup target for backups from remote or mobile backup clients and data sources ('assets in motion').

Backup software vendors typically provide service under a service level agreement (SLA) that establishes the terms and costs to use the network and transmit/store data specifies minimum resource allocations (e.g., storage space) and performance requirements (e.g., network bandwidth) provided by the provider. The backup software may be any suitable backup program such as EMC Data Domain, Avamar, and so on. In cloud networks, it may be provided by a cloud service provider server (e.g., Amazon, EMC, Apple, Cisco, etc.).

In a standard backup environment, an asset (data source or backup client) is assigned a single (primary) backup target where backup data is always written. This provides the highest efficiency as the primary target has knowledge about the backup source based on prior backup operations. In certain situations, however, the primary backup target availability is limited and can cause backups to be exceedingly slow or even fail completely. This can result in compliance issues as certain SLA conditions may not be achieved.

Embodiments of system 100 provide an environment where a backup system can be configured to use a temporary backup target (TBT) on any infrastructure provider (e.g., customer owned, GCP, Azure, AWS, VMware, etc.) on an as-needed basis. The backup system will be able to use an existing TBT or create new instances of temporary backup targets as necessary. The backup system supports a set of rules around the creation, lifetime and deletion of temporary backup targets in order to customize the availability. This will improve overall backup performance and SLA adherence. The backup system also has monitoring and report generation capability to show the history and status of all temporary backup targets in order to provide insights on deployment and provisioning.

A temporary backup target provides a location for backup data to be sent to temporarily in order to minimize data loss due to undesirable availability of a data sources' primary backup target. A TBT may pre-exist or it may be dynamically provisioned on-demand as needed. Backup agents will negotiate with the backup system to identify and find the preferred or most appropriate TBT to send the backup data for a particular or scheduled backup operation. If there is no existing TBT that is be deemed to be sufficient, the backup agent may deploy a new TBT based on established rules. As the future location of a mobile client may be known or anticipated, temporary backup targets may be deployed in advance to avoid the latency occurs when starting up a TBT target on demand. Integration with a user's travel itinerary such as can be done with scheduling or travel software (e.g., Concur and others) can provide dates and locations of where a mobile device may be on any given date.

The backup agent also maintains a set of metadata so that the backup data sent to a TBT will only need to include the data that has been changed since the prior backup. The incremental backup data will later be sent to and consolidated at the primary backup target, at which point recovery operations of these backups can execute. Recovery operations will only be possible from the primary backup target, and therefore data that has not be consolidated will not be available for restoration until it has been consolidated.

Figure 2:
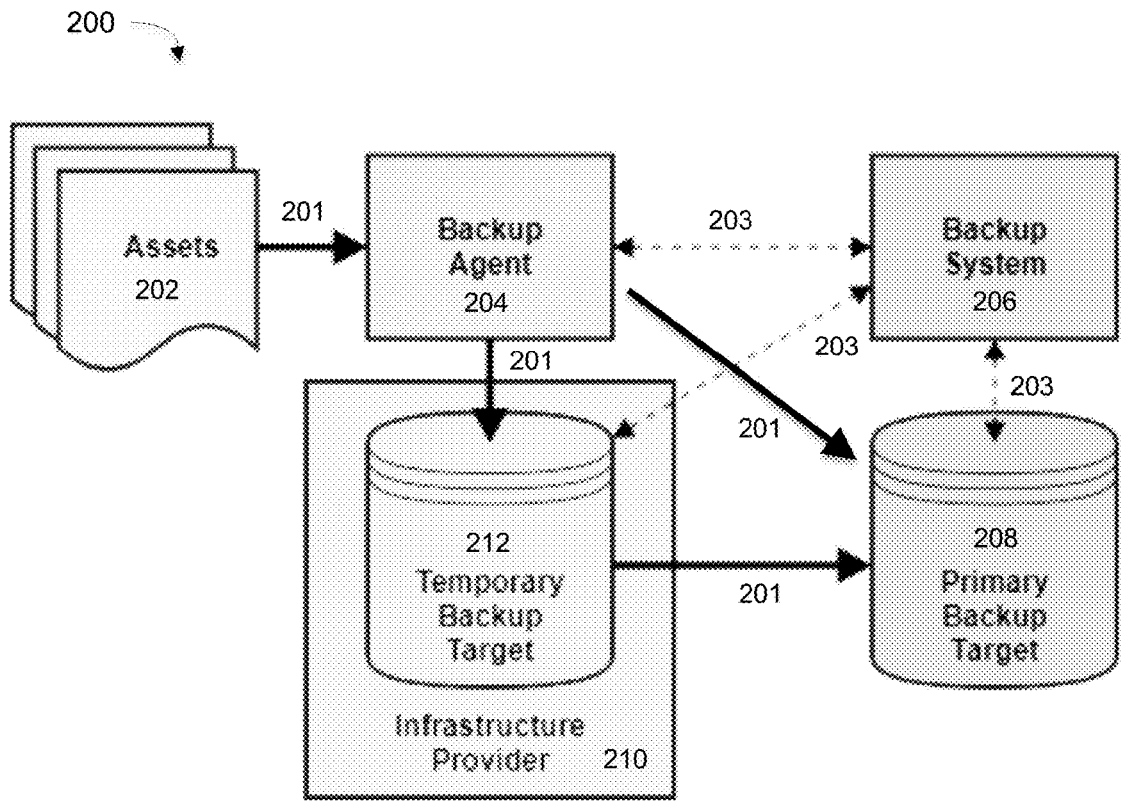
FIG. 2 is a block diagram of illustrating functional components of an intelligent destination target selection process, under some embodiments.

FIG. 2 is a block diagram of illustrating functional components of an intelligent destination target selection process, under some embodiments. System 200 of FIG. 2 illustrates the five main components in the architecture of the destination target selection process. Assets 202 are the applications and/or the data and datasets that are being protected. These are the systems, services, or other data sources that contain vital customer assets need to be protected from potential data loss. Examples of these could be file system files, databases, virtual machines, data centers, and so on.

The backup agent will write the data along data path 201 to either the primary backup target 208 or the TBT 212 as directed by backup system 206. The backup system 206 will communicate via the control path 203 with the primary backup target 208 and TBT 212 in order to direct the backup agent 204 where to write the data. If it is written to the TBT 212, it is later consolidated to the primary backup target 208.

The assets 202 are transmitted through data path 201 to a backup agent 204 ultimately, as directed by control path 203, to the backup system 206. The backup agent 204 is responsible for performing the backup and moving the backup data from an asset 202 to the backup storage target, which may be a primary backup target 208. The agent 204 is a standalone process that can be run on the same system as an asset or can also run on another system. A backup agent 204 will be able to backup one or more assets 202. The backup agent communicates with the backup system 206 in order to negotiate the preferred backup target. In some situations this could be the primary backup target 208 or a temporary backup target 212.

The backup system 206 has all the traditional backup system capabilities like managing protection (backup) policies, assets, copies, recovery operations, searches, and so on, as well as viewing monitoring and reporting for alerts and jobs. In addition, the backup system 206 communicates with the backup agent 204 regarding the asset details for the backup operation, the schedule for when to perform a backup, the location for where to send the backup data, and it provides any other configuration information that might be needed by the backup agent.

In addition, a set of rules may be incorporated in the backup system that affects the usage of TBT's 212. These may apply to a single device or a grouping of devices. Some examples rules are: (1) prohibit the usage of TBT's, (2) only allow TBT's on certain infrastructures or certain availability zones (e.g., AWS only), and (3) only use an existing primary backup target 208.

The primary backup target 208 is responsible for receiving and storing the consolidated backup data from the backup agent or agents 204. This will be a fixed backup storage location that will be fairly persistent and not change very frequently. The backup system 206 is responsible for data consolidation from 212 to 208.

The temporary backup target 212 is responsible for quickly receiving the backup data from a backup agent 204 and then forwarding that data on to the primary backup target 208 after the backup has completed with the backup agent. The lifecycle of a TBT is determined by configuration rules setup in the backup system 206. These rules are highly flexible to allow creating a TBT 212 as a single backup use or for as long as desired, and even permanently.

For the embodiment of FIG. 2, the TBT 212 is provided by an infrastructure provider 210, such as a public cloud provider (e.g., AWS, etc.) or a remote data center owned by the customer. For this use case, having the TBT's lifecycle only be for a single backup could lower or eliminate compute costs. Another use case could be where there is a conference and a group of employees will all be remote for several days, in which a system administrator could setup a co-located TBT, scheduling it to remain up from the start to the end of the conference. Yet another use case is where there may be assets that need a long-living TBT and the lifecycle could be configured appropriately.

The infrastructure provider 210 is used to create and destroy TBT 212 on demand (e.g., as an AWS, Azure, VMware vSphere element). The backup system 206 will be configured with one or more of the infrastructure providers. The backup system 206 can then communicate with the infrastructure provider in order to provision new instances of a TBT.

In most cases a TBT will simply be data storage such as an AWS S3 bucket and therefore will not require any compute resources. The backup system 206 will create an AWS S3 bucket (in the case of an AWS-based TBT) as needed and write asset data 201 to a set of objects within a bucket. TBT's can be destroyed by the backup system 206 only after all data has been consolidated to each asset's respective primary backup target. An empty TBT (one in which all data has been consolidated) may persist if any backup target anticipates future use the TBT as configured in the lifecycle rules.

In an embodiment, TBT's are a type of compute-less storage target, such as AWS S3. Backup agents 204 will examine asset backup metadata in order to determine what new and/or changed data must be sent to a TBT.

The backup operation operates on various metadata elements. In an embodiment, The backup agent 204 has access to backup metadata which may reside on any one of three locations, the asset 202, the backup agent 204, or at a backup target (212 or 208). It is possible for this metadata to reside in any combination of these three locations. When a backup operation begins, the changed data needs to be determined. There are two primary types of backup metadata that may exist: file-based or hash-based. The metadata in a file-based system requires the backup agent to determine which files have changed since the last backup. Those changed files will be transmitted to the TBT 212. Consolidation is a simple process where the changed files from the TBT are copied to the asset. A list of deleted files is also transmitted so that they may be removed during consolidation.

The metadata in a hash-based system requires the system to identify newly created hashes. This requires the backup agent to determine the files or objects that have changed since the last backup and then generate hashes from each changed file or object. Each hash will be compared to the set of hashes that have previously been transmitted (such as a hash cache) and only transmit the new hashes and data to the TBT. Metadata about how the hashes relate to each other (e.g., in a Merkle tree) will be retained so that consolidation may properly construct the backup data. As above, a delete list is created, transmitted and processed.

Figure 3:
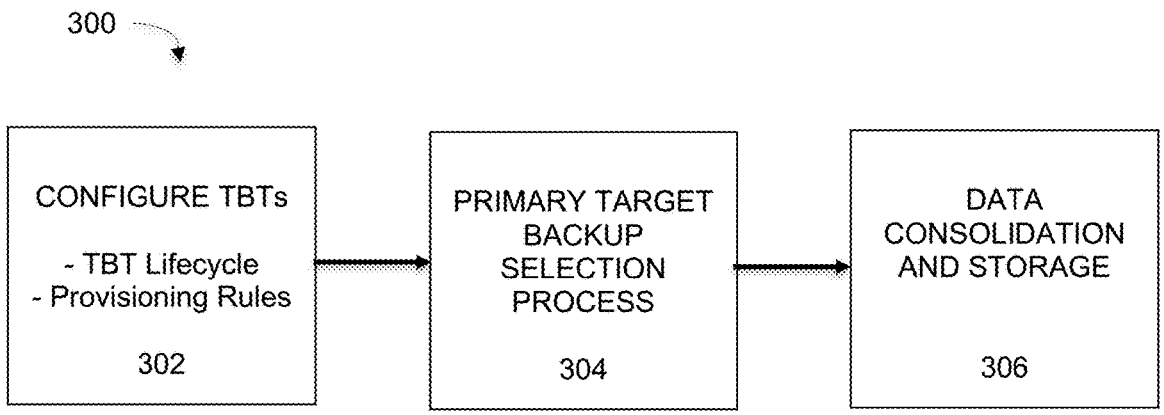
FIG. 3 is a diagram illustrating some main components of the deployment and use of a temporary backup target, under some embodiments.

The temporary backup targets 212 can be configured to have a lifecycle that is permanent, semi-permanent, or operational just for a single backup. The backup agent 204 negotiates with the backup system in order to calculate the TBT to be used in order to complete a backup that adheres to the established rules such as the SLA. FIG. 3 is a system diagram 300 illustrating some main components of the deployment and use of a temporary backup target, under some embodiments. As shown in FIG. 3, the first component 302 is the configuration of a TBT an defining how a backup administrator can configure the lifecycle of the various TBTs and the provisioning rules with the infrastructure provider 210. The second component 304 is the backup target selection process that happens between the backup agent 204 and the backup system 206. The third component 306 controls how the backup data is consolidated from the TBT 212 to the primary backup target 208 for permanent storage and recovery purposes.

As shown in system 300 of FIG. 3, a first component of the destination target selection process 120 is the TBT deployment configuration, 302. This step configures the on-demand deployment of TBTs in various datacenters. A backup system administrator will have the ability to configure one or more infrastructure providers 210, which will give the backup system 206 the ability to deploy TBTs 212 as needed. In addition, for scenarios where backup agents 204 are commonly using a temporary backup storage target, the backup manager could retain a TBT to service multiple backups. Other additional rules could be added to allow tuning the lifecycle of the TBTs, by implementing certain policies, such as "destroy TBT if not used within 2 hours," and so on.

The next feature of system 300 involves an automatic negotiation process between the backup agent 204 and the backup system 206 to determine the optimal backup storage target. The negotiation process is triggered either by a scheduled backup, manually by a user, or possibly by other system events like, but not limited to, detecting a new network connection.

Figure 4:
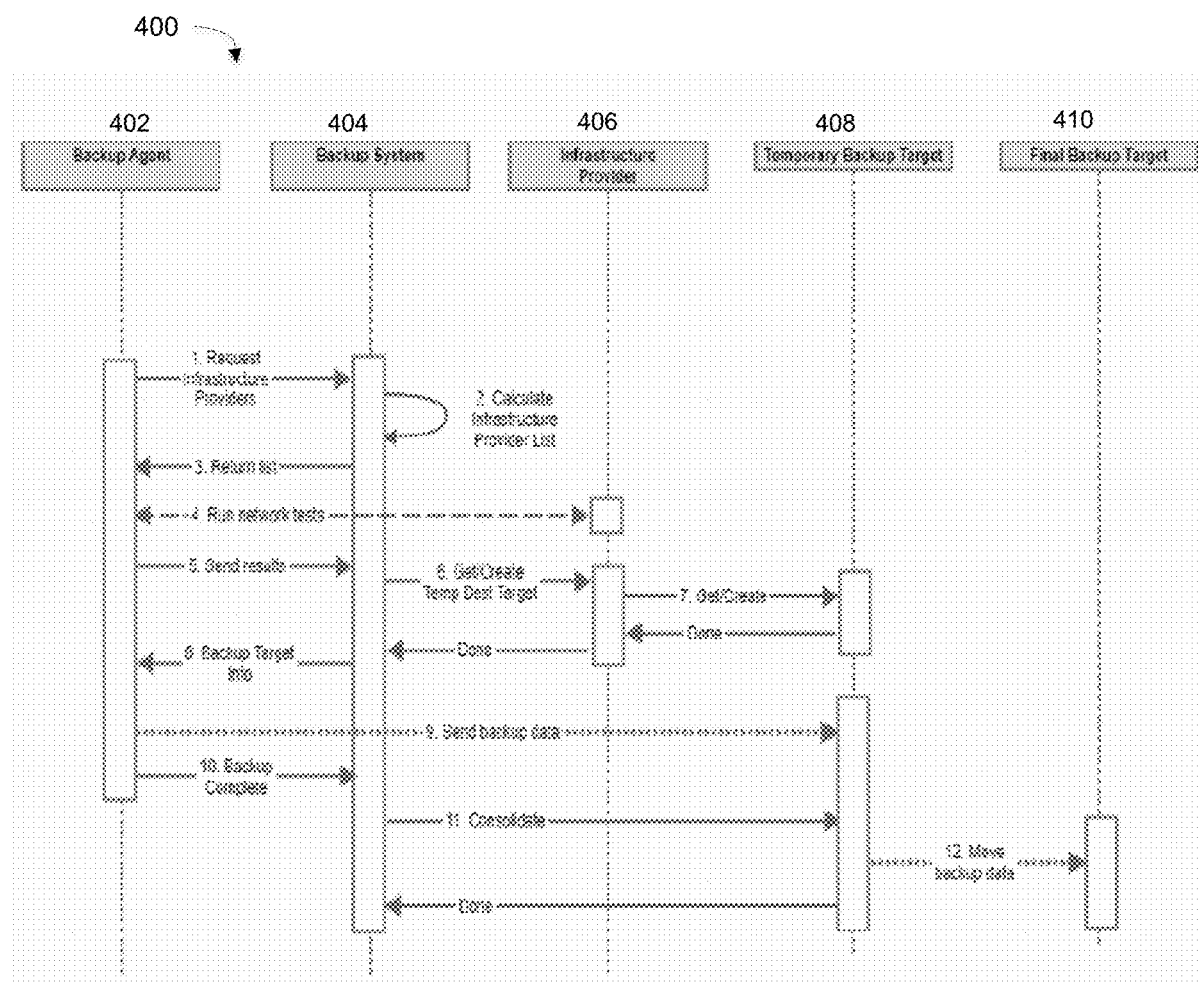
FIG. 4 is a state transition diagram that illustrates the process of selecting an optimal backup storage target and transmitting the backup data and consolidating data to the primary target, under some embodiments.

FIG. 4 is a state transition diagram 400 that illustrates the process of selecting an optimal backup storage target and transmitting the backup data and consolidating data to the primary target, under some embodiments. Diagram 400 illustrates certain processes performed by and between a backup agent 402, a backup system 404, an infrastructure provider 406, a TBT 408, and a final backup target 410.

As shown in in FIG. 4, the process starts (1) with the backup agent 402 sending a message to the backup system 404 providing geolocation and other potentially useful information like IP, or network connection type (e.g., Cellular, Wired, Personal Wireless, Public Wireless, and so on) in addition to the list of valid infrastructure providers that can be used for creating a TBT.

The backup system 404 (in step 2) uses the given information from the backup agent in order to calculate a prioritized list of infrastructure provider networks. Various algorithms can be used in order to determine the top infrastructure provider networks to return. One example would be to use geolocation information, and return infrastructure providers that have the closest geographic distance with the asset. The primary backup target will also be included with the first list returned in order to determine if there is enough significant difference in speed from the infrastructure provider networks and the primary backup target. The list of possible network targets to check is then returned to the backup agent 402, step 3.

Although embodiments are directed to finding and processing storage targets with based on the closest geographical location, embodiments are not so limited. Such geographic location basically comprises a physical distance between the data asset and a specific target storage location (e.g., data center) as measured in straight-line miles (or similar units). In other embodiments, other measures of data travel may be used, such as direct/indirect routing links, data transmission times, and so on.

Figure 5:
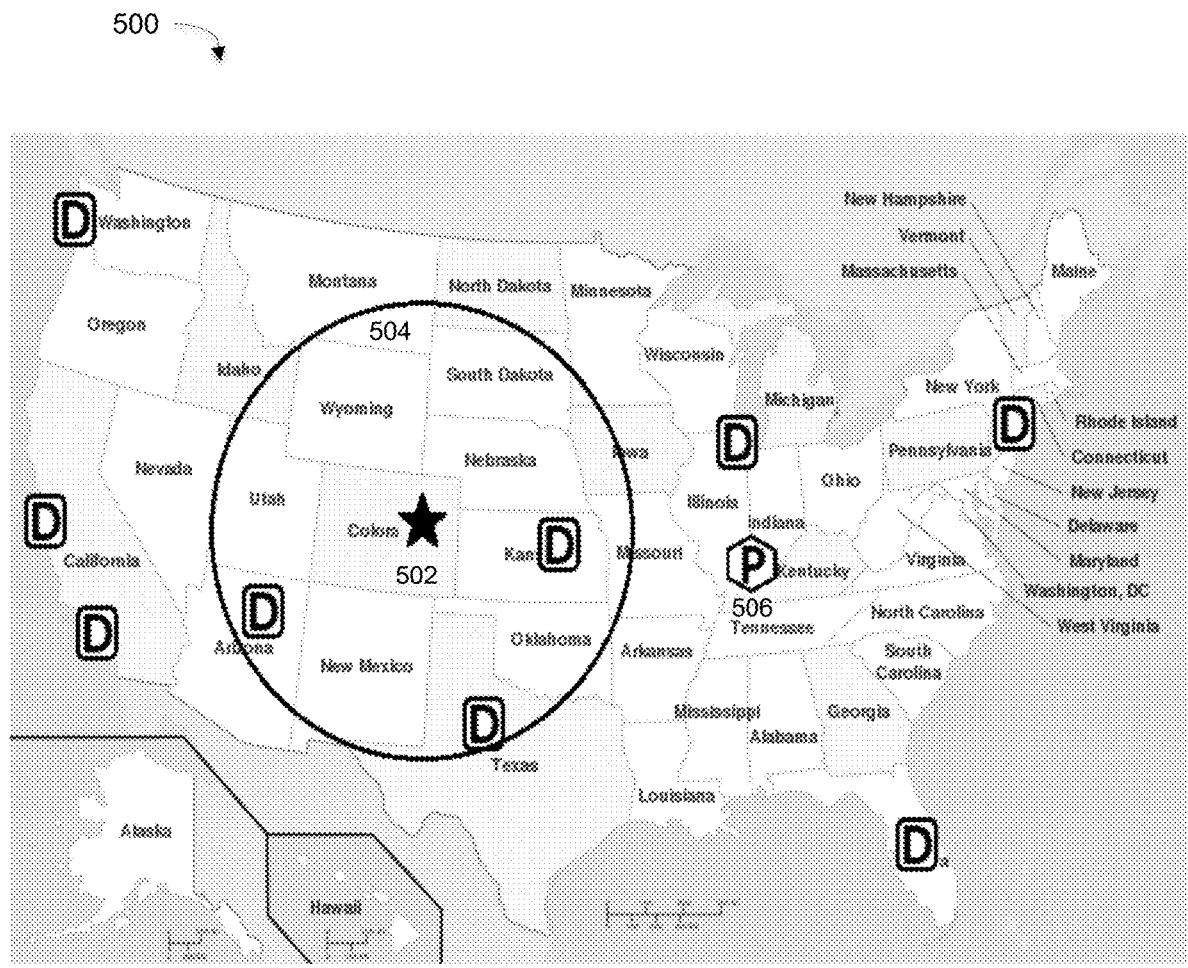
FIG. 5 illustrates the selection of an infrastructure provider networks by a backup system for an asset, in an example embodiment.

FIG. 5 illustrates the selection of an infrastructure provider networks by a backup system for an asset, in an example embodiment. Diagram 500 shows a map of the United States with an asset 502 located in Denver, Colorado. Data Centers ('D') are scattered throughout the country, and the three closest data centers to the asset are located in Kansas, Arizona, Texas, as shown by the circle 504, and the primary backup target ('P') 506 is located in Indiana. Under process 400, the primary backup target's network information would be sent in the list. The list of possible network targets to check is also returned to the backup agent. FIG. 5 is a visual representation of how the backup system 404 could pick the infrastructure provider networks for the asset 502 in Denver. The three closest data centers in Kansas, Arizona, Texas, and the primary backup target's 506 network information would be sent in the list of step 3.

After receiving the list, the backup agent 402 performs some throughput and other connection tests with each of the given items in the list, step 4. The goal with this step is to get the data needed in order to calculate the best possible destination to which to send the backup data. Using the calculations obtained, the backup agent 402 can take the throughput and the backup size to estimate a backup duration for each of the destinations provided in step 3.

The results are then sent back to the backup system 404 (in step 5) in order for it to determine if the estimated backup duration is in acceptable limits or if different infrastructure provider networks should be evaluated. This negotiation will be repeated until either a maximum number of negotiation attempts is exceeded or an optimal infrastructure provider is selected. Further details of this negotiation process are outlined in FIG. 6 below.

In step 6, the backup system 404 gets or creates the TBT, 408. There are three possible scenarios for selecting the optimal backup target. The first is to select the primary backup target 410. In this case, no additional work needs to be performed, and the backup agent 402 can send backup data directly to the primary backup target as the final backup target 410. The second is to select an infrastructure provider 406 that does not have a TBT created. In this case, the backup system 404 will need to provision the necessary TBT 408 using the infrastructure provider's APIs, as shown in step 7 of FIG. 3. The third is to select an infrastructure provider that already has the needed TBT 408 running.

For the selected TBT or primary backup target, the backup target information will then be sent to the backup agent 402 (step 8).

In step 9, the backup agent 402, using the metadata it manages in order to determine what asset data needs to be sent, will send the full or incremental backup to the backup target given in step 8. The backup agent 402 then notifies the backup system 404 that it has completed sending the backup data over to the backup target (step 10).

The backup system 404 then notifies the TBT 408 to move the completed (consolidated) backup data over to the final backup target 410 (step 11). The TBT then moves the data to the final backup target, or equivalently primary backup target) 410.

Figure 6:
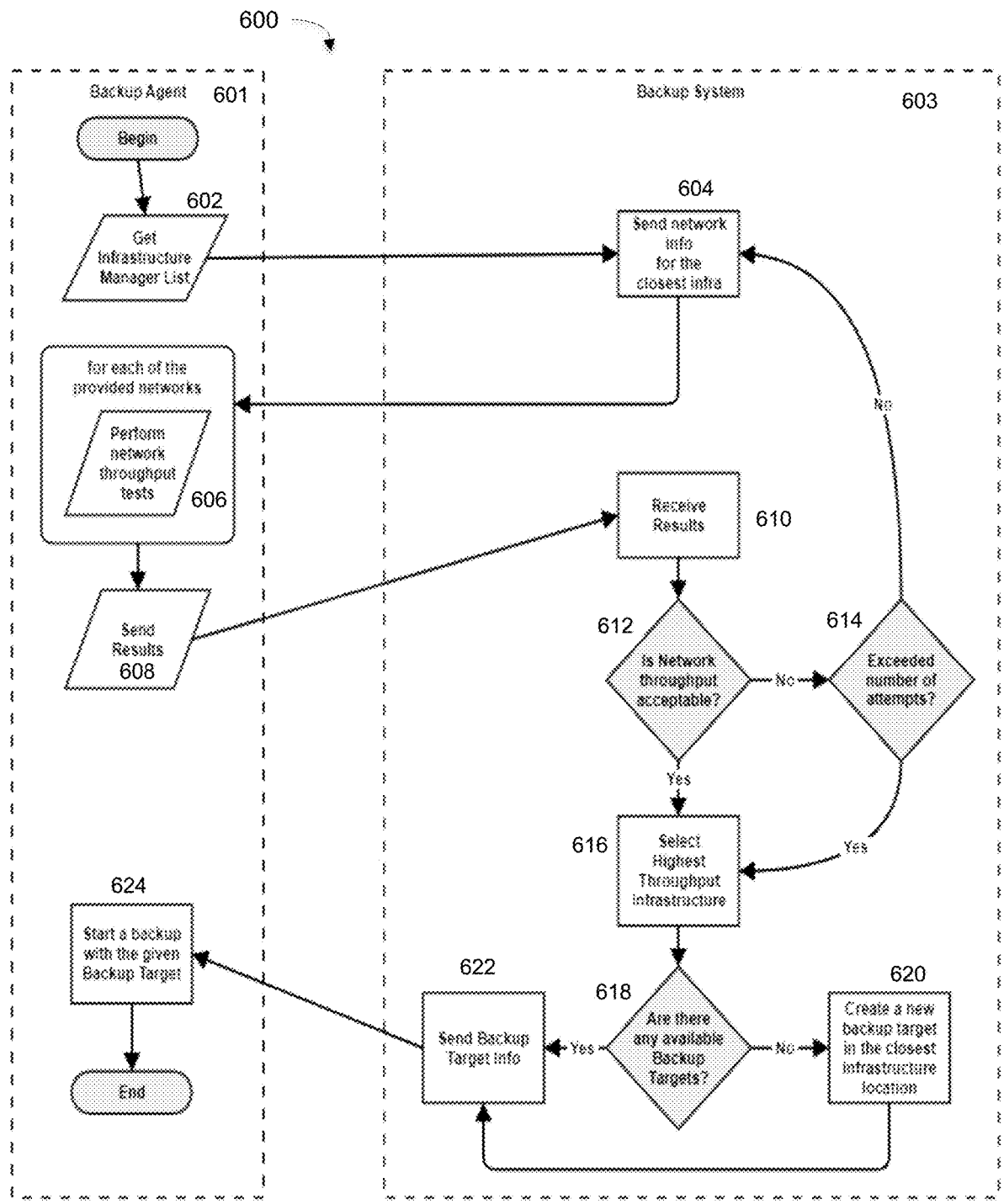
FIG. 6 is a flow diagram illustrating interactions between a backup agent and backup system when selecting an optimal backup target, under some embodiments.

FIG. 6 is a flow diagram illustrating interactions between a backup agent 601 and a backup system 603 for method of negotiating selection of an optimal backup target, under some embodiments.

Process 600 starts with the backup agent 601 obtaining an infrastructure manager list, 602, which is a list of providers and allowable locations per provider, and that is stored in the backup system. The backup agent 601 sends a message to the backup system 603 providing geolocation, and the backup system 603 uses the given information from the backup agent 601 in order to calculate a prioritized list of infrastructure provider networks. In an embodiment, the infrastructure providers that have the closest geographic distance with the asset are returned in the list, along with the primary backup target Upon receiving the list of the 'P' and 'D' elements (e.g., as in FIG. 5), the backup agent 401 performs some throughput and other connection tests 606 for each of the networks provided in the list, and the test results are then sent back 608 to the backup system 603 for receipt 610 in order for it to determine if the estimated backup duration is in acceptable limits or if different infrastructure provider networks should be considered for use. This negotiation will be repeated until either a maximum number of negotiation attempts is exceeded or an optimal infrastructure provider is selected. Thus, as shown in FIG. 6, in decision block 612, it is determined whether or not the network throughput for a given network provider is acceptable based on certain defined threshold values. If not, the process determines whether or not a threshold number of networks has been tested, 614. If not, the next closest infrastructure provider is processed 604 for the network throughput tests, 606. If the threshold number of networks has been tested, or if in step 612 the network throughput is acceptable, the process selects the infrastructure provider with the highest throughput, 616.

Once the highest throughput infrastructure provider has been selected, 616, the process determines whether or not there are any available backup targets 618. If not, the process creates a new backup target in the closest infrastructure provider location, 620. If there is an available backup target available (from 618) or for a created new backup target (from 620), the backup target information is sent 622 to the backup agent 602. The backup agent then starts a backup operation with the given backup target, 624.

With reference back to FIG. 3, the final step of process 300 is the consolidation of the backups, 306. In an embodiment, this is done after the backup agent 204 has completed sending all the required backup data to the TBT 212. The agent will then be able to mark its backup complete and notify the backup system 206. The backup system will now orchestrate moving the backup copy stored on the TBT to the primary backup target 208 where it can be consolidated with the other backup copies. This will occur without intervention by the backup agent 204. After consolidation is complete the normal data protection activities, such as backup restore, replication, and so on, can occur.

Figure 7:
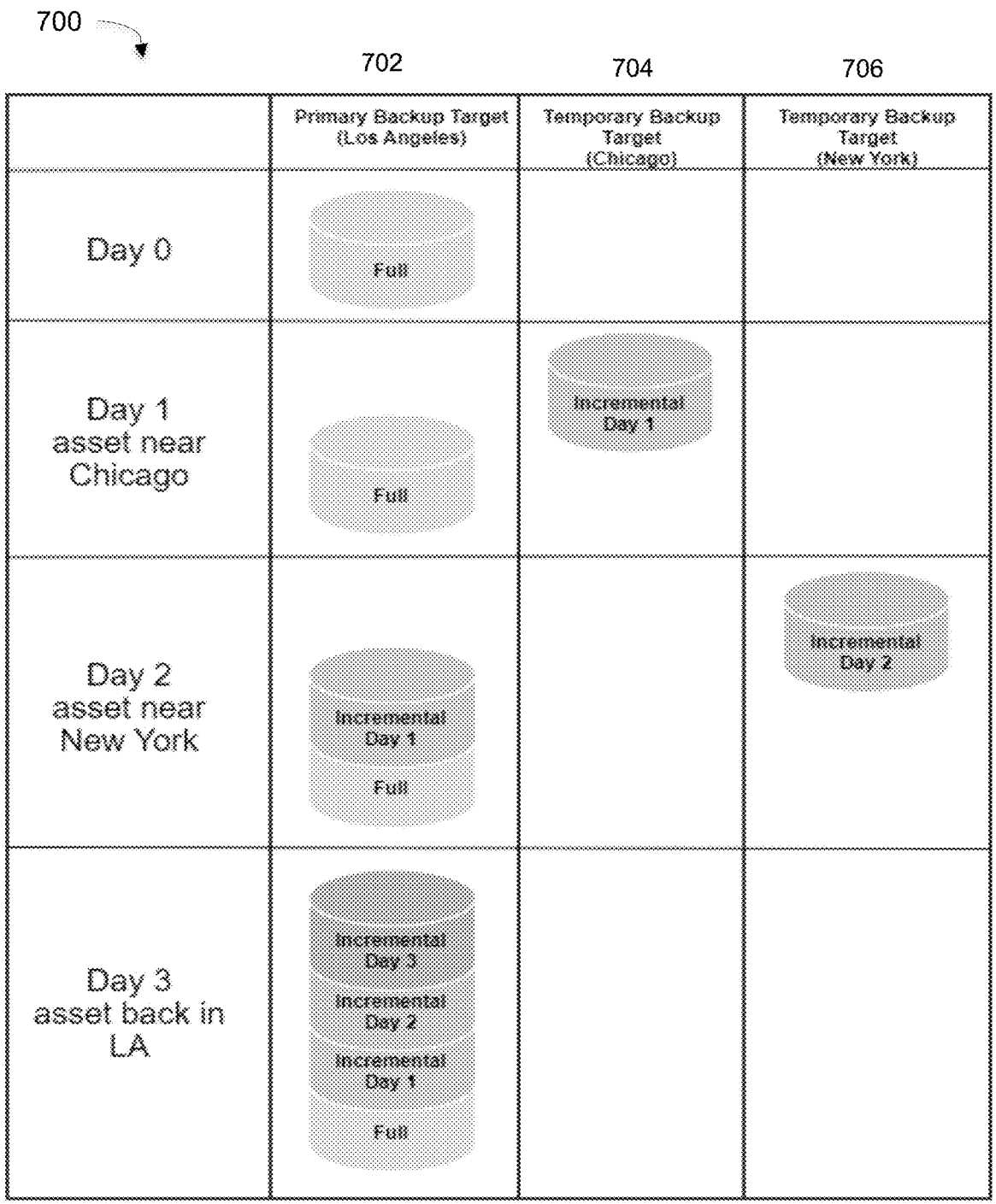
FIG. 7 illustrates an example data flow between the asset, temporary backup target, and the final primary backup target for a consolidation operation, under some embodiments.

FIG. 7 illustrates an example data flow between the asset, TBT, and the final primary backup target for a consolidation operation, under some embodiments. Diagram 700 illustrates an example consolidation of data among a primary backup target 702 in Los Angeles, a TBT 704 in Chicago, and a TBT 706 in New York over a four-day period (Day 0 to Day 3). For this example, on Day 0, the asset is determined to have the best connection to the primary backup target 702, so the full backup is sent directly there. On Day 1, the asset has moved (e.g., by a user on a laptop) to a new location that has the best connection with the Chicago datacenter 704. A TBT is automatically provisioned by the backup system in the Chicago datacenter and the backup agent sends an incremental backup there. On Day 2, the incremental backup from Day 1 was moved and consolidated from the Chicago TBT 704 to the primary backup target 702 in Los Angeles. The asset has since moved closer to the New York datacenter and the Backup Agent sent the incremental backup data to the TBT 706 located in the New York datacenter. On Day 3, the Day 2 incremental backup was moved and consolidated and the asset is now back in Los Angeles and the incremental backup can be sent directly to the primary backup target 702.

Embodiments thus describe a system that automatically determines the ideal backup target for the backup agent to send its backup data. The system will automatically create and destroy temporary backup targets in order to handle the current backup traffic and provide the optimal throughput. The Backup Agent is able to send incremental backups to any TBT which are later consolidated on the primary backup target after the agent has disconnected from the system.

TBT Awareness for Data Restores

As described above, embodiments are directed to systems where an asset (e.g., laptop computer) may choose to send backup data to a temporary backup target (TBT) such that when an asset is first identified and backed up, the data is sent to as primary backup target (PBT), where the PBT is the backup system (software and storage) where the asset was first protected. In this case, the incremental/differential backups will also be sent to this PBT while the asset is in its "home" location. Certain assets, however, such as mobile devices (laptops, tablets, phones, etc.) may not always be in their "home" location, as they are inherently portable and used by mobile users. In this case, sending the backup data to the PBT is not always practical, and future incremental backups may be sent to a TBT which is a simply a data storage system (e.g. Amazon S3). Under the above-described embodiments, restore operations can only operate on data that has landed on the PBT, and data stored on a TBT is not available for restore until this data has been consolidated back to the PBT. This results in restore operations that may not always have access to the most recent backup, which is usually the data that is most useful for restoration.

Embodiments are thus further directed to a system where assets have access to all backups, including the data on the TBT(s) before that data is consolidated back to the PBT. In order to facilitate data backup to a TBT and restore operations from data located on a PBT or TBT or combination of both, a Backup Location Catalog (BLC) is created for each asset and will reside on the asset. In addition a Change Record Catalog (CRC) is created for each TBT backup per asset and each CRC will reside on the asset until the associated data is consolidated back to the PBT.

Figures 8, 9:
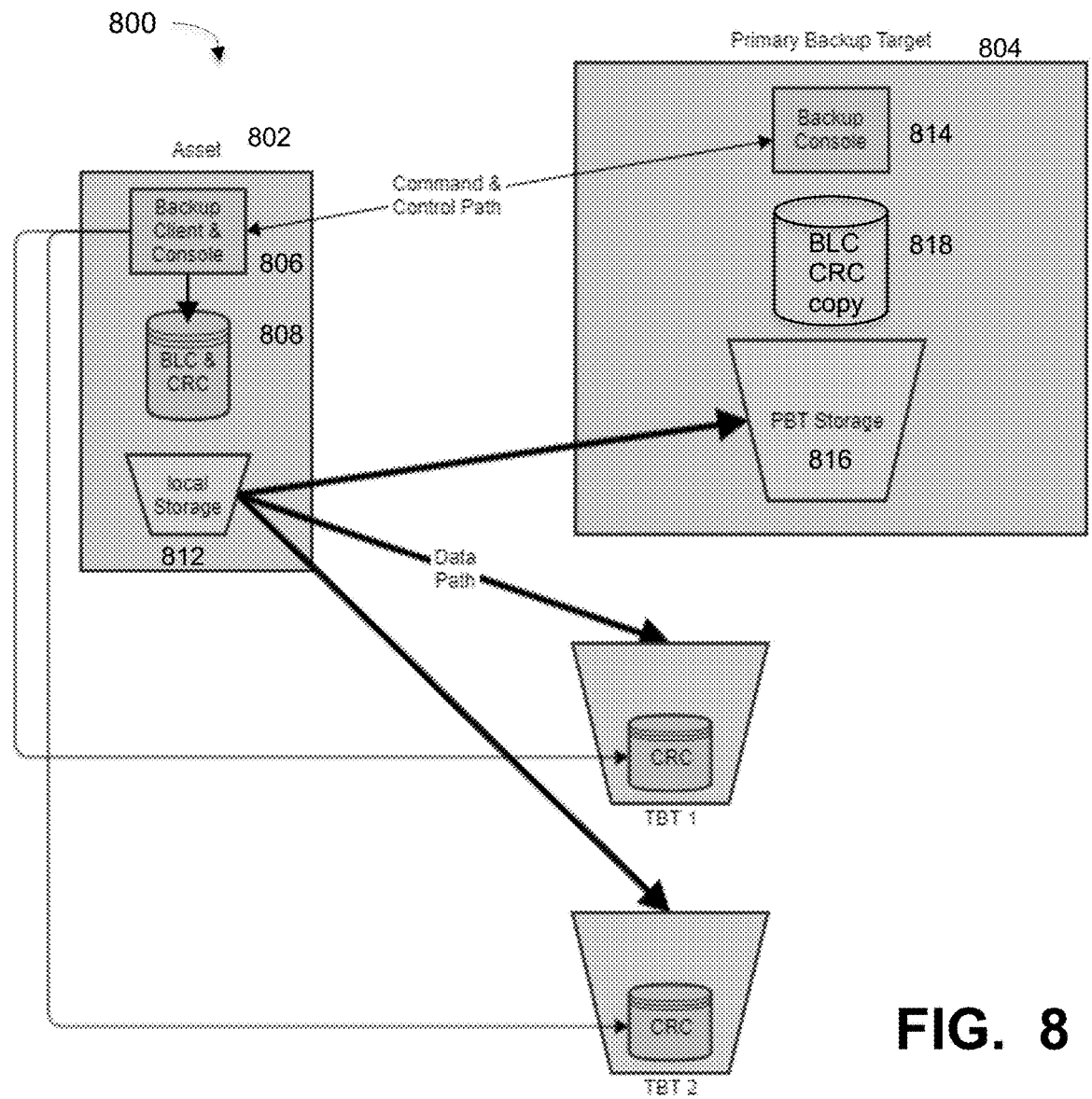
FIG. 8 illustrates the use of a Backup Location Catalog (BLC) and Change Record Catalog (CRC) for awareness of temporary backup targets for data restores, under some embodiments.
FIG. 9 is a table 900 that illustrates a portion of a backup location catalog, under an example embodiment.

FIG. 8 illustrates the use of a Backup Location Catalog and Change Record Catalog for awareness of temporary backup targets for data restores, under some embodiments. As shown in FIG. 8, system 800 comprises an asset 802 having a backup client and console 806, and local storage 812. A BLC and CRC 808 are coupled to the backup client and console 806 in the asset.

The asset is coupled to a backup console 814 of the PBT 804 over a command and control path. The backup client and console 806 reside on each client. In addition, another console exists on the PBT 814 which can be used to restore data that was generated by the asset 802 to an alternate location such as when the asset is no longer available as in a disaster recovery situation. For the example of FIG. 8, data is backed up from local asset storage 812 over data paths to the PBT storage, and one or more TBTs, such as denoted TBT 1 and TBT 2 in system 800. When a TBT is used as a backup target by an asset, the local backup software 806 will record the location of each backup in the BLC 808 and all changes to the assets' filesystem since the prior backup will be stored in a CRC 808 per TBT backup. Data written to BLC will be transmitted to the PBT storage 816 when a connection from the asset 802 to the PBT 804 is possible.

A copy 818 of the BLC and CRC is maintained on the PBT. A copy of the CRC will also be maintained in each TBT or bucket (e.g., AWS S3 bucket for AWS-based TBT) for each backup written to a TBT (e.g., TBT 1, TBT 2) in order to support Disaster Recovery operations.

When a restore operation is initiated, the backup software 806 will pull together all of the backup data and metadata (files/version/dates) from the PBT and TBT backups. While all data will always be available from the local client (assuming continued access to the PBT and all TBTs), the PBT backup console 814 will, in addition to the PBT data, only have access to TBT backups based on the most recently transmitted BLC 808 to the PBT 804. Until all TBT data has been consolidated, the local (on asset) version of the catalogs will be considered the source of valid data, and the data in the PBT storage 816 or the TBT CRC catalog will only be used for Disaster Recovery operations, such as for data corruption or complete loss of an asset.

During backup operations, data is written from local storage 812 to a PBT 804 or TBT (TBT 1, TBT 2). TBT backups update the local and BLC and CRC 808 on the asset 802. During each TBT backup, the CRC is written to the newly created bucket. BLC changes are transmitted to the PBT when a connection is possible.

In an embodiment, the backup location catalog (BLC) 808 on an asset 802 records the date and location of each backup for an asset. Consecutive backups to the PBT will be combined into a single row in this catalog. Each TBT backup record will be a separate row and will not be merged in this catalog. Consolidation will remove TBT entries and update the oldest PBT entry until all data has been consolidated from the TBT(s) to the PBT.

FIG. 9 is a table 900 that illustrates a portion of a backup location catalog, under an example embodiment. Each row in this catalog consists of date/timestamp in column 901 and a backup location in location column 902. The location column begins with a PBT row that means that the backup resides in its normal backup format on the assets' primary backup target and will be represented in the form PBT:<url> where URL (uniform resource locator) is the network address of the PBT server. All other (TBT) backup rows identify where a dump of assets' files are located with each row representing an additional backup. As shown in the example, the form of those locations are recited as: <Provider>:<region>@<storageType>:<assetName>:<date>. As the asset name will always be unique across an organization, a namespace (such as an AWS bucket name) will be composed of the assetName and date. All data per backup per asset will be sent to a separate bucket. During each backup operation, the BLC 808 will be modified and stored locally on the asset 802. The BLC will also be sent to the PBT 804 when a connection is available. Note that an asset with no TBT backups (including after all TBT backups have been consolidated to the PBT) will not have a BLC.

Table 900 is provided for purposes of illustration only and embodiments are not so limited. A backup location catalog can be implement using many other formats and data content.

With respect to the temporary backup target (TBT), each TBT backup bucket will contain the contents of each modified or created file since the prior backup. Each created/modified file is stored along with a fully qualified path as known by the asset. As S3 and other TBT provider (e.g. Azure Storage) typically provide object storage and not a hierarchical file system, the fully qualified (hierarchical) path may be emulated via the object name. Each file is stored as a single object. Various different file naming conventions can be used. In addition, various different directory hierarchies and file system conventions can be used to implement a TBT bucket under different embodiments. For example the file degAlertsAll.go in a particular directory tree on the asset can have an object named "/c/Data/UI/deg/degAlerts/degAlertsProducts/degAlertsAll/degAlertsAll.go," and the contents of this object will be the contents of the file from the asset at the relevant point in time.

With respect to the Change Record Catalog (CRC), for each TBT backup, a change record catalog will exist in each TBT bucket in addition to being stored locally on the asset. It will contain a list of all changes to the filesystem including some system level information. The CRC contains enough information for the backup clients to present to the user the state of an asset at any point in time. This will be used by restore operations to locate the files to be restored or assist in a disaster recovery situation. For example, a CRC file may be named deltas.json and may contain file information included files created/modified/deleted/moved, location information, directory links to changed file data, and so on. Various different file naming conventions can be used, along with various different directory hierarchies and file system conventions to implement a CRC file, under embodiments.

Figure 10:
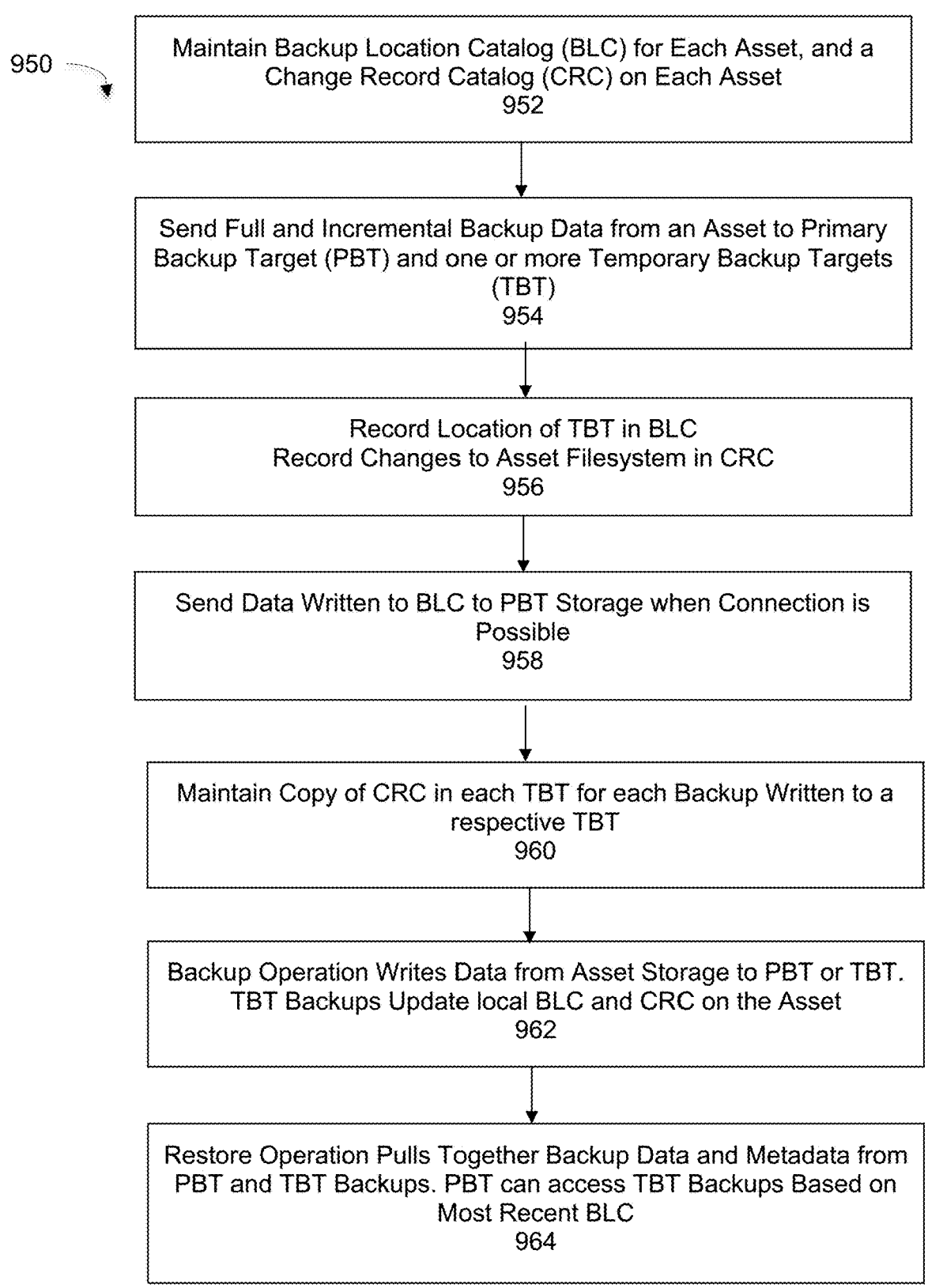
FIG. 10 is a flowchart that illustrates a method of providing intelligent target selection for portable assets using awareness of temporary backup targets, under some embodiments.
Figure 11:
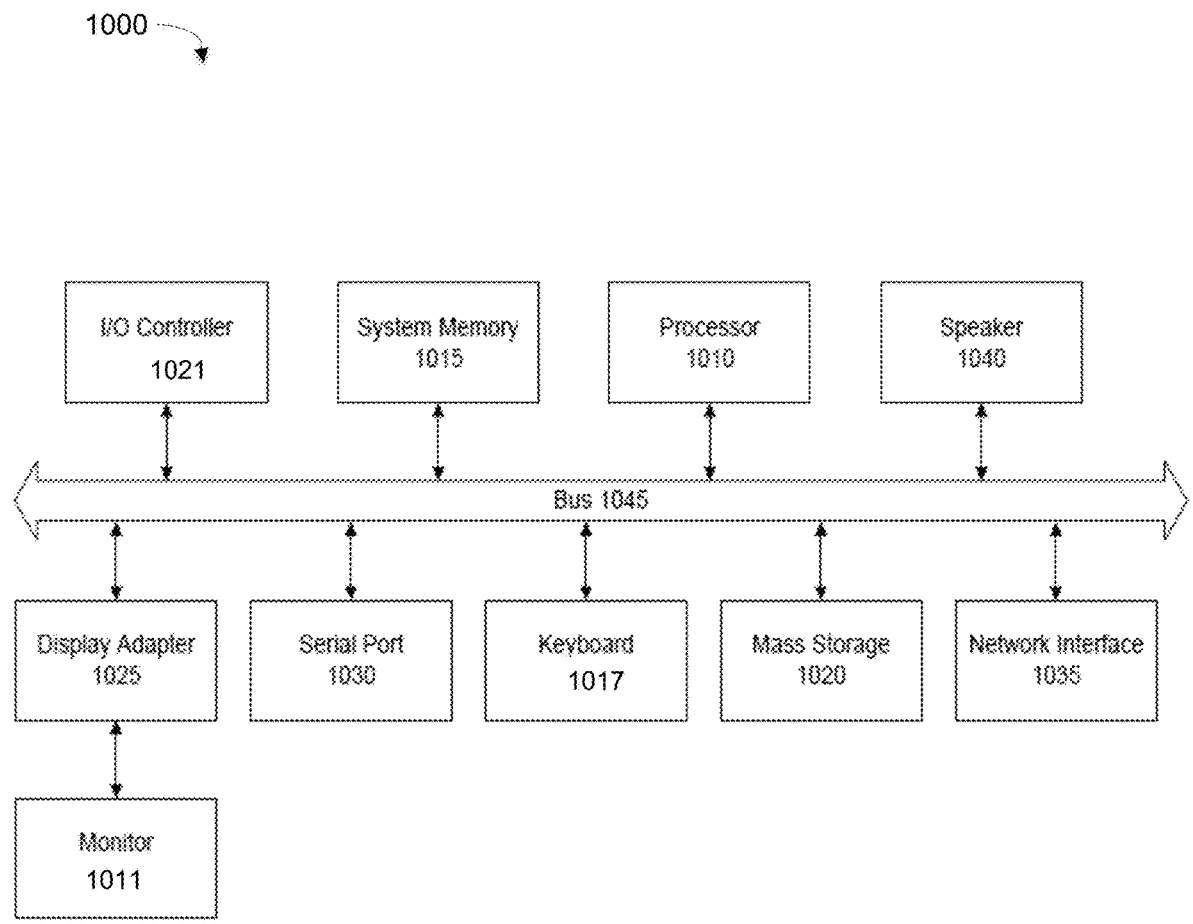
FIG. 11 is a system block diagram of a computer system used to execute one or more software components described herein, under some embodiments.

FIG. 10 is a flowchart that illustrates a method of providing intelligent target selection for portable assets using awareness of temporary backup targets, under some embodiments. Such a process provides access by assets to all backups before that data is consolidated back to the PBT to facilitate backup and restores when an asset physically moves from a home environment where the PBT may be located. As shown in process 950, and as described above the system maintains a BLC for each asset and a CRC on each asset, 952. Backup data is then sent from the asset to the PBT and one or more TBTs, 954. The TBT stores only incremental data, while the PBT will have a full and usually most incremental backups, as the TBT is only used while an asset is away from it "home" location. The asset backup software will then record the location of each backup in the BLC and all changes to the assets' filesystem in the CRC for a respective TBT backup, 956. Data written to the BLC will be transmitted to the PBT storage when a connection is possible, 958. A copy of the CRC will also be maintained in each TBT or bucket for each backup written to a TBT, 960.

During backup operations, 962, data is written from asset local storage to a PBT 804 or TBT, and TBT backups update the local and BLC and CRC on the asset.

During restore operations 964, the backup software evaluates (pulls together) all of the backup metadata from the PBT and TBT backups and determine which data is to be pulled from the PBT and which data should be pulled from a TBT The PBT can access the data stored in TBT backups based on the most recently transmitted BLC. This allows data assets to have access to all backups including data on a TBT before the data is consolidated back to the PBT so that restores can operate on data before it has landed on the PBT.

In general, restores evaluate the metadata to determine what data is needed, and only pull that data from the PBT and/or TBT to restore the asset to the desired state as specified in the backup console by the user (e.g., yesterday's data, last week's data, etc.). The consolidation step is a different process where data on the TBTs are moved to the PBT.

In an embodiment, restore operations 964 can be initiated from either backup console 806 or 814 on the asset 802 or PBT 804, respectively. Either the local console or the PBT console will be able to restore any retained version of any file assuming connectivity to the PBT 804 and all TBTs (e.g., TBT 1, TBT 2). In the case of the PBT, the backups available to restore will include the PBT data and the TBT backups where the BLC 808 data was received. In the case of disaster recovery, the PBT 804 will search all known TBTs and look for backups that belong to the asset. The latest version of each file across the PBT and all found TBTs will be used to create a new asset from all available backup data for the "lost" asset. Likewise, the asset local console 806 will be able to restore any retained version of any file assuming connectivity to the PBT and all TBTs.

In order to perform a restore (from either console) system will combine the oldest PBT backup records and the CRC data from the TBT backups to present the user with backups from all points in time, as limited only by the retention policy for the asset. A synthetic catalog will be built using the metadata from the PBT backup and the CRC records. For each chosen file, the system will determine the appropriate data source (PBT or TBT) based upon the version chosen in the restore console. Restores of PBT versions of files can use deduplication technology to efficiently retrieve only the necessary data, while restores of TBT versions will require a full file moves. This data egress event from a public cloud provider will generally incur a cost.

Consolidation is the process of moving data from Temporary Backup Targets to the Primary Backup Target. This is always done starting with the oldest TBT entry in the catalog to the most recent. Consolidation of a TBT backup involves moving the data from the TBT location to temporary storage on the asset and then running the normal PBT backup so that it will reside in the PBT in its native format (e.g. DeDup). The temporary storage location will need to be remapped to the "true" location of the data so that the backup process can properly add this new data to asset's backups. In addition to processing the created and modified files from a TBT, the CRC must be processed so that the assets' backup also correctly handle files that were moved or deleted. When this consolidation is complete, the TBT bucket can be deleted and the BLC can be updated so that the oldest PBT entry date is updated and the oldest TBT row is removed.

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

The network of FIG. 1 may comprise any number of individual client-server networks coupled over the Internet or similar large-scale network or portion thereof. Each node in the network(s) comprises a computing device capable of executing software code to perform the processing steps described herein. FIG. 8 shows a system block diagram of a computer system used to execute one or more software components of the present system described herein. The computer system 1000 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is just one example of a computer system suitable for use with the present system. Other configurations of subsystems suitable for use with the described embodiments will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the described embodiments. Additionally, steps may be subdivided or combined. As disclosed herein, software written in accordance certain embodiments may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of selecting optimum destination storage for mobile data assets, comprising:
   automatically determining a primary backup target (PBT) to send backup data of a data asset;
   sending incremental backups of the data asset to the primary backup target and one or more temporary backup targets (TBTs) based on movement of the data asset from one geolocation to another geolocation;

first maintaining, in the data asset, a backup location catalog (BLC) and a change record catalog (CRC);
second maintaining, in a temporary backup target (TBT), a copy of the CRC for a backup written to the TBT;
updating, by the TBT, the BLC and CRC in the data asset upon a backup to the TBT; and
combining, during a restore operation, data and metadata of a backup from the PBT and TBT, wherein the updating allows the PBT to access the backup to the TBT based on a most recent updated BLC.

2. The method of claim 1 wherein the PBT comprises a final storage location that is a geographically fixed backup storage location and that comprises an optimal storage target based on geographic closeness to the data asset.

3. The method of claim 1 wherein each TBT is active for a duration defined by configuration rules stored in the backup system, and wherein the configuration rules further identify one or more temporary backup targets that may not be used for temporary storage of the backup data, or that may be conditionally used based on availability zones or current existence.

4. The method of claim 1 wherein the BLC records a data and location of each backup for the data asset.

5. The method of claim 4 wherein the BLC comprises a table listing the PBT in which the backup resides, and one or more entries identifying each TBT storing a copy of the backup, and wherein the PBT table entry comprises consecutive backups to the PBT combined into a single row, and wherein each TBT backup record comprises a separate row in the table.

6. The method of claim 5 wherein the combining removes the TBT entries, and updates the oldest PBT entry until all data is combined from the one or more TBTs to the PBT.

7. The method of claim 6 wherein the TBT comprises a backup bucket containing contents of each modified or created since a previous backup, wherein each file is stored is stored together with its path in a hierarchical filesystem.

8. The method of claim 7 wherein the CRC is stored in the TBT bucket and locally on the data asset, and contains a list of all changes to the filesystem.

9. The method of claim 8 wherein the restore operation combines oldest PBT backup records and CRC data from TBT backups to present to a user backups from all points in time in accordance with a defined retention policy for the data asset.

10. The method of claim 9 further comprising:
building a synthetic catalog using metadata from the PBT backup and CRC records;
determining, for a chosen file, an appropriate data source from a PBT or TBT based upon a specified version; and
retrieving PBT versions of the file using deduplication to efficiently retrieve only necessary data.

11. A system for selecting optimum destination storage for remote and mobile data assets, comprising:
a backup agent initiating a backup of a data asset to a backup system by automatically determining a storage target for the backup agent to send backup data of the data asset;
a primary backup target (PBT) automatically selected to receive backup data of the data asset;
a backup system sending incremental backups of the data asset to the primary backup target and one or more temporary backup targets (TBTs) based on movement of the data asset from one geolocation to another geolocation, first maintaining, in the data asset, a backup location catalog (BLC) and a change record catalog (CRC); and
a temporary backup target (TBT) maintaining a copy of the CRC for a backup written to the TBT, and updating the BLC and CRC in the data asset upon the backup to the TBT, the backup system combining, during a restore operation, data and metadata of a backup from the PBT and TBT, wherein the updating allows the PBT to access the TBT backup based on a most recent updated BLC.

12. The system of claim 11 wherein the PBT comprises a final storage location that is a geographically fixed backup storage location and that comprises an optimal storage target based on geographic closeness to the data asset, and further wherein each TBT is active for a duration defined by configuration rules stored in the backup system, and wherein the configuration rules further identify one or more temporary backup targets that may not be used for temporary storage of the backup data, or that may be conditionally used based on availability zones or current existence.

13. The system of claim 11 wherein the BLC records a data and location of each backup for the data asset.

14. The system of claim 13 wherein the BLC comprises a table listing the PBT in which the backup resides, and one or more entries identifying each TBT storing a copy of the backup, and wherein the PBT table entry comprises consecutive backups to the PBT combined into a single row, and wherein each TBT backup record comprises a separate row in the table.

15. The system of claim 14 wherein the combining removes the TBT entries, and updates the oldest PBT entry until all data is combined from the one or more TBTs to the PBT.

16. The system of claim 15 wherein the TBT comprises a backup bucket containing contents of each modified or created since a previous backup, wherein each file is stored is stored together with its path in a hierarchical filesystem.

17. The system of claim 16 further comprising a TBT bucket storing the CRC, wherein the CRC is also stored locally on the data asset, and contains a list of all changes to the filesystem.

18. The system of claim 17 wherein the restore operation combines oldest PBT backup records and CRC data from TBT backups to present to a user backups from all points in time in accordance with a defined retention policy for the data asset.

19. The system of claim 18 further comprising a synthetic catalog built using metadata from the PBT backup and CRC records, wherein the backup system further determines, for a chosen file, an appropriate data source from a PBT or TBT based upon a specified version, and retrieves PBT versions of the file using deduplication to efficiently retrieve only necessary data.

20. A non-transitory computer program product embodied as tangible media containing programming code which, when executed by a processor, cause the processor to perform a method of selecting optimum destination storage for mobile data assets, comprising:
automatically determining a primary backup target (PBT) to send backup data of a data asset;
sending incremental backups of the data asset to the primary backup target and one or more temporary backup targets (TBTs) based on movement of the data asset from one geolocation to another geolocation;
first maintaining, in the data asset, a backup location catalog (BLC) and a change record catalog (CRC);
second maintaining, in a temporary backup target (TBT), a copy of the CRC for a backup written to the TBT;

updating, by the TBT, the BLC and CRC in the data asset upon the backup to the TBT; and combining, during a restore operation, data and metadata of a backup from the PBT and TBT, wherein the updating allows the PBT to access the backup to the TBT based on a most recent updated BLC.

\* \* \* \* \*